US012598452B2

(12) United States Patent
Yu et al.

(10) Patent No.: US 12,598,452 B2
(45) Date of Patent: Apr. 7, 2026

(54) SIDELINK DISCOVERY

(71) Applicant: Apple Inc., Cupertino, CA (US)

(72) Inventors: Yu-Ting Yu, San Francisco, CA (US);
Christian W. Mucke, Munich (DE);
Haijing Hu, Los Gatos, CA (US); **Sree
Ram Kodali**, San Jose, CA (US);
Sudeep Manithara Vamanan,
Nuremberg (DE); Yuqin Chen, Beijing
(CN); Zhibin Wu, Los Altos, CA (US)

(73) Assignee: Apple Inc., Cupertino, CA (US)

( * ) Notice: Subject to any disclaimer, the term of this
patent is extended or adjusted under 35
U.S.C. 154(b) by 862 days.

(21) Appl. No.: 17/593,493

(22) PCT Filed: Oct. 22, 2020

(86) PCT No.: PCT/CN2020/122893

§ 371 (c)(1),
(2) Date: Sep. 20, 2021

(87) PCT Pub. No.: WO2022/082629

PCT Pub. Date: Apr. 28, 2022

(65) Prior Publication Data

US 2022/0312177 A1     Sep. 29, 2022

(51) Int. Cl.
H04W 4/00     (2018.01)
H04W 8/00     (2009.01)
H04W 28/02     (2009.01)
(52) U.S. Cl.
CPC ....... H04W 8/005 (2013.01); H04W 28/0252
(2013.01)

(58) Field of Classification Search
CPC . H04W 8/005; H04W 28/0252; H04W 28/02;
H04W 8/00
(Continued)

(56) References Cited

U.S. PATENT DOCUMENTS 9,706,387 B2 *  7/2017  Agiwal .................. H04W 72/51
9,769,862 B2 *  9/2017  Sheng ................... H04W 76/14
(Continued)

FOREIGN PATENT DOCUMENTS

CN        106464715        2/2017
WO     2015/169464     11/2015
(Continued)

OTHER PUBLICATIONS

ZTE Corporation, "Missing field description for inter-frequency
sidelink discovery"; 3GPP TSG-RAN WG2 Rel-13 LTE ASN.1
review Ad-Hoc Meeting, R2-160039, Jan. 13-14, 2016, 4 sheets.
(Continued)

*Primary Examiner* — Marceau Milord
(74) *Attorney, Agent, or Firm* — Fay Kaplun & Marcin,
LLP

(57)         ABSTRACT

A user equipment (UE) is configured to transmit a discovery
message for a sidelink connection. The UE receives a
discovery message configuration, wherein the discovery
message configuration includes at least one parameter dedi-
cated to transmitting a discovery message for the second
connection, transmits the discovery message as a broadcast
and receives a signal from the further UE regarding the
discovery message, wherein the second connection is a
sidelink connection.

18 Claims, 4 Drawing Sheets

<u>300</u>

(58) Field of Classification Search

USPC .......................................................... 370/329

See application file for complete search history.

(56) References Cited

U.S. PATENT DOCUMENTS

| | | | | |
|---|---|---|---|---|
| 9,826,563 | B2 | 11/2017 | Sheng | |
| 10,200,846 | B2 * | 2/2019 | Agiwal | H04W 76/25 |
| 11,903,084 | B2 * | 2/2024 | Back | H04W 8/005 |
| 2015/0208384 | A1 * | 7/2015 | Baghel | H04W 72/04 |
| | | | | 455/450 |
| 2016/0014599 | A1 * | 1/2016 | Ho | H04L 9/0861 |
| | | | | 380/270 |
| 2016/0302250 | A1 * | 10/2016 | Sheng | H04W 76/14 |
| 2017/0215059 | A1 * | 7/2017 | Agiwal | H04L 65/40 |
| 2017/0257876 | A1 * | 9/2017 | Loehr | H04W 72/51 |
| 2018/0098370 | A1 | 4/2018 | Bangolae et al. | |
| 2018/0287689 | A1 * | 10/2018 | Lee | H04W 48/16 |
| 2018/0317268 | A1 * | 11/2018 | Kim | H04W 8/005 |
| 2018/0324842 | A1 * | 11/2018 | Gulati | H04W 72/1263 |
| 2019/0028947 | A1 * | 1/2019 | Adachi | H04W 60/00 |
| 2019/0253866 | A1 * | 8/2019 | Abedini | H04L 5/0094 |
| 2019/0253955 | A1 * | 8/2019 | Abedini | H04B 7/088 |
| 2019/0268748 | A1 * | 8/2019 | Abedini | H04W 4/46 |
| 2019/0268944 | A1 * | 8/2019 | Abedini | H04W 74/08 |
| 2019/0268945 | A1 * | 8/2019 | Abedini | H04W 8/005 |
| 2019/0380152 | A1 * | 12/2019 | Abedini | H04W 56/0045 |
| 2021/0100027 | A1 * | 4/2021 | Xue | H04W 52/365 |
| 2021/0127253 | A1 * | 4/2021 | Fakoorian | H04L 5/005 |
| 2021/0153062 | A1 * | 5/2021 | Zhang | H04W 40/246 |
| 2021/0185757 | A1 * | 6/2021 | Purkayastha | H04W 72/20 |
| 2021/0219385 | A1 * | 7/2021 | Paladugu | H04W 8/005 |
| 2021/0250749 | A1 * | 8/2021 | Cheng | H04W 12/0471 |
| 2021/0289580 | A1 * | 9/2021 | Damnjanovic | H04W 8/005 |
| 2022/0046404 | A1 * | 2/2022 | Ljung | H04W 56/0015 |
| 2022/0046746 | A1 * | 2/2022 | Yang | H04W 52/0216 |
| 2022/0104180 | A1 * | 3/2022 | Yang | H04W 24/08 |
| 2023/0180267 | A1 * | 6/2023 | Chae | H04L 5/0048 |
| | | | | 370/328 |
| 2023/0217232 | A1 * | 7/2023 | Cheng | H04W 8/005 |
| | | | | 370/328 |
| 2023/0284299 | A1 * | 9/2023 | Paladugu | H04W 8/005 |
| | | | | 370/329 |

FOREIGN PATENT DOCUMENTS

| | | | | |
|---|---|---|---|---|
| WO | WO-2021001086 A1 * | 1/2021 | .......... | H04B 7/2606 |
| WO | WO-2022038292 A1 * | 2/2022 | .......... | H04W 12/02 |

OTHER PUBLICATIONS

Huawei et al., "Common aspects for L2 and L3 UE-to-Network relay"; 3GPP TSG-RAN WG2 Meeting #111 electronic, R2-2008049, Aug. 17-28, 2020, 6 sheets.

* cited by examiner

SIDELINK DISCOVERY

BACKGROUND

A user equipment (UE) may be configured with multiple communication links. For example, the UE may receive a signal from a cell of a network over a downlink and may transmit a signal to the cell over an uplink. The UE may also be configured to communicate with a further UE via a sidelink. The term sidelink refers to a communication link that may be utilized for device-to-device (D2D) communication. Thus, the sidelink may facilitate communication between the UE and the further UE without the use of a cell.

The sidelink may also be used as a radio relay link. For example, to facilitate communication between the network and the remote UE in a UE-to-Network relay, the network may exchange signals with the relay UE via an uplink/downlink and the relay UE may exchange signals with the remote UE via a sidelink. Similarly, to facilitate communication between a first remote UE and a second remote UE in a UE-to-UE relay, the first remote UE may exchange signals with the relay UE via a first sidelink and the second remote UE may exchange signals with the relay UE via a second sidelink.

SUMMARY

Some exemplary embodiments are related to a user equipment (UE) having a transceiver configured to communicate with a base station via a first connection and at least one further UE via a second connection and a processor communicatively coupled to the transceiver and configured to perform operations. The operations include receiving a discovery message configuration, wherein the discovery message configuration includes at least one parameter dedicated to transmitting a discovery message for the second connection, transmitting the discovery message as a broadcast based on the discovery message configuration and receiving a signal from the further UE regarding the discovery message, wherein the second connection is a sidelink connection.

Other exemplary embodiments are related to a processor of a first user equipment (UE) configured to perform operations. The operations include receiving a discovery message configuration from a base station, wherein the discovery message configuration includes at least one parameter dedicated to transmitting a discovery message by the first UE, transmitting the discovery message as a broadcast based on the discovery message configuration and receiving a signal from a second UE regarding the discovery message via sidelink communications.

DETAILED DESCRIPTION

Figure 1:
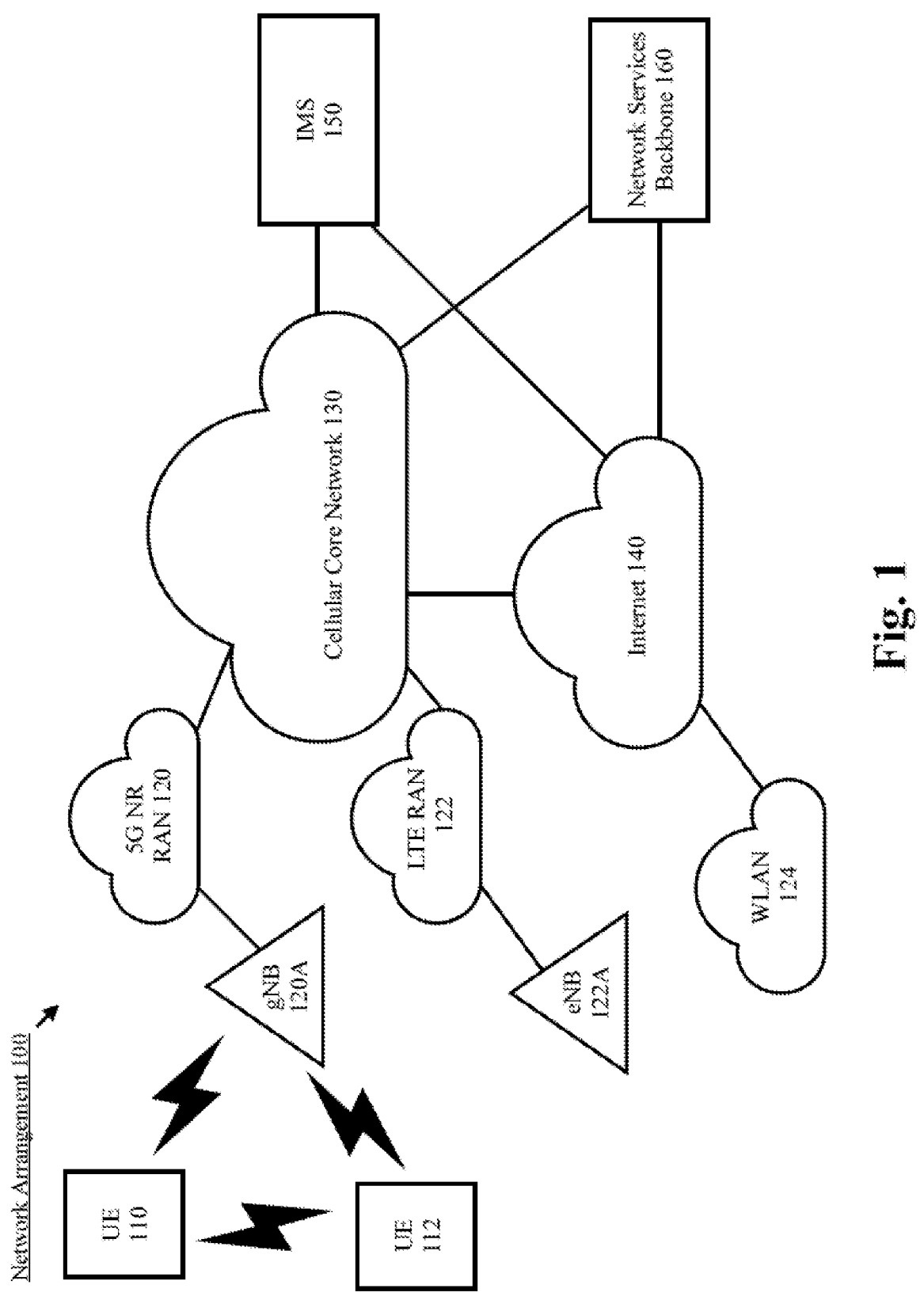
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to implementing a power efficient discovery messaging procedure for sidelink communications.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any electronic component.

The exemplary embodiments are also described with regard to a sidelink. The term "sidelink" generally refers to a communication link between the UE and a further UE. The sidelink provides direct device-to-device (D2D) communication where information and/or data exchanged between the UE and the further UE via the sidelink does not go through a cell. In some configurations, a single sidelink provides bidirectional communication between the UE and the further UE. In other configurations, a single sidelink provides unidirectional communication between the UE and the further UE. The exemplary embodiments may apply to either a bidirectional or unidirectional sidelink.

Sidelink communications are supported by Long Term Evolution (LTE) and fifth generation (5G) new radio (NR) standards. In some configurations, the network may provide information to the UE that indicates how a sidelink is to be established, maintained and/or utilized. Thus, while the information and/or data exchanged over the sidelink does not go through a cell, the UE and the network may exchange information associated with the sidelink. In other configurations, a sidelink is not under the control of the network. In either configuration, the UE and the further UE may still perform synchronization procedures, discovery procedures and exchange control information corresponding to the sidelink.

From the perspective of a remote UE, the relay selection procedure may include operations such as, but not limited to, scanning for available relay UEs, collecting measurement data and selecting one of the available relay UEs to use as a relay point. From the perspective of a relay UE, the relay selection procedure may include operations such as, but not limited to, transmitting a discovery message indicating the availability of the relay UE to serve as a relay point for a remote UE.

In 5G NR, there is no defined sidelink discovery channel to support direct discovery service. Thus, the discovery procedure typically includes discovery messages being received at layer 2 (L2) from an upper layer as quality of service (QoS) data multiplexed to a sidelink radio bearer (SLRB) and then to a physical sidelink shared channel (PSSCH) as part of a transport block (TB). Based on the resource selection procedure, the UE performs a scanning procedure and chooses a subchannel and slot to send the discovery message. The PSSCH broadcasts the source/destination ID in a sidelink control information (SCI) transmission. If no conflicts exist, the UE then transmits the discovery message via the PSSCH. However, if a conflict does exist, the resource selection procedure is repeated. For a two-way message exchange between two UEs, the above steps are repeated twice (once for each direction of messaging). The UEs expend a large amount of power performing this procedure.

According to exemplary embodiments, the relay UE may be configured with a dedicated discovery resource pool configured for upper layer discovery services. The discovery message(s) is mapped to this dedicated discovery resource pool. If the relay UE does not find an interested party (another UE that seeks to exchange sidelink communications with the relay UE), the relay UE may enter a power save mode to save power. This may similarly apply to the remote UE. If the remote UE does not find a relay UE, the remote UE may enter a power save mode to save power.

According to further exemplary embodiments, the relay UE may be configured to send discovery messages during a predefined time period dedicated to discovery messages. If the relay UE does not find an interested party during the discovery period, the relay UE may enter a power save mode to save power. This may similarly apply to the remote UE. That is, the remote UE may be configured with a relay discovery period. If the remote UE does not find a relay UE within the relay discovery period, the remote UE may enter a power save mode to save power.

FIG. 1 shows an exemplary network arrangement 100 according to various exemplary embodiments. The exemplary network arrangement 100 includes UEs 110, 112. Those skilled in the art will understand that the UEs 110, 112 may be any type of electronic component that is configured to communicate via a network, e.g., a component of a connected car, a mobile phone, a tablet computer, a smartphone, a phablet, an embedded device, a wearable, an Internet of Things (IoT) device, etc. An actual network arrangement may include any number of UEs being used by any number of users. Thus, the example of two UEs 110, 112 is merely provided for illustrative purposes.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. These types of networks support vehicle-to-everything (V2X) and/or sidelink communication. However, the UE 110 may also communicate with other types of networks and the UE 110 may also communicate with networks over a wired connection. Therefore, the UEs 110, 112 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, Sprint, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN via the gNB 120A. Reference to a single gNB 120A is merely for illustrative purposes. The exemplary embodiments may apply to any appropriate number of gNBs. The UEs 110, 112 may also connect to the LTE-RAN 122 via the eNB 122A.

Those skilled in the art will understand that any association procedure may be performed for the UEs 110, 112 to connect to the 5G NR-RAN 120 and the LTE-RAN 122. For example, as discussed above, the 5G NR-RAN 120 and the LTE-RAN 122 may be associated with a particular cellular provider where the UEs 110, 112 and/or the user thereof has a contract and credential information (e.g., stored on a SIM card). Upon detecting the presence of the 5G NR-RAN 120, the UEs 110, 112 may transmit the corresponding credential information to associate with the 5G NR-RAN 120. More specifically, the UEs 110, 112 may associate with a specific base station (e.g., the gNB 120A of the 5G NR-RAN 120, the eNB 122A of the LTE-RAN 122).

The UEs 110, 112 may also communicate with one another directly using a sidelink. The sidelink is a direct D2D communication link. Thus, the information and/or data transmitted directly to the other endpoint (e.g., the UE 110 or the UE 112) does not go through a cell (e.g., gNB 120A, eNB 122A). In some embodiments the UEs 110, 112 may receive information from a cell regarding how the sidelink is to be established, maintained and/or utilized. Thus, a network (e.g., the 5G NR-RAN 120, LTE-RAN 122) may control the sidelink. In other embodiments, the UEs 110, 112 may control the sidelink. Regardless of how the sidelink is controlled, the UEs 110, 112 may maintain a downlink/uplink to a currently camped cell (e.g., gNB 120A, eNB 122A) and a sidelink to the other UE simultaneously.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
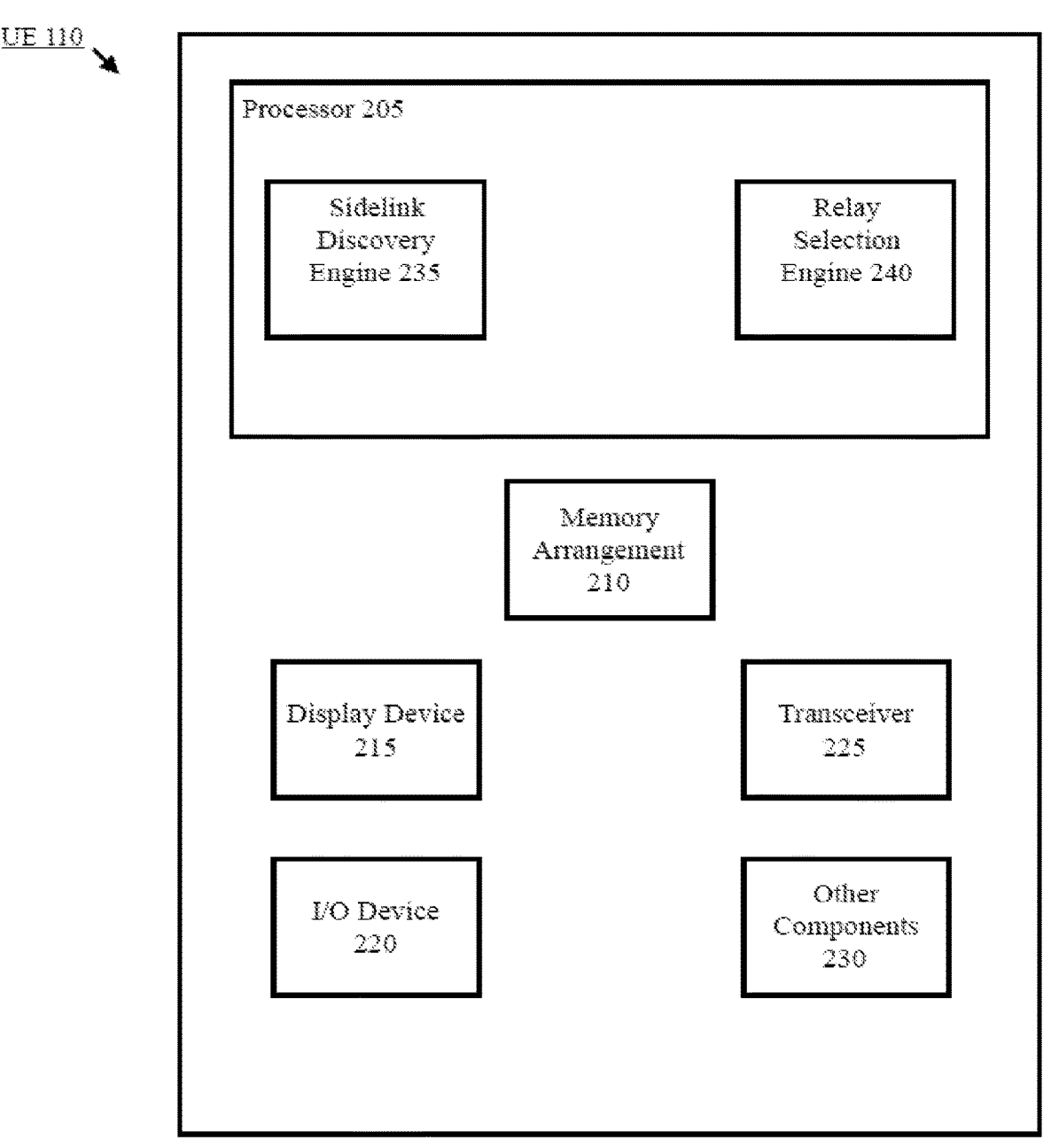
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 235 may include, for example, an audio input device, an audio output device, a power supply, a data acquisition device, ports to electrically connect the UE 110 to other electronic devices, etc. The UE 110 illustrated in FIG. 2 may also represent the UE 112.

The processor 205 may be configured to execute a plurality of engines of the UE 110. For example, the engines may include a sidelink discovery engine 235 and a relay selection engine 240. The sidelink discovery engine 235 may perform operations related to advertising the availability of the UE 110 to serve as a relay UE. The sidelink discovery engine 235 may also perform operation related to detecting available related UEs. The relay selection engine 240 may perform operations related to selecting a relay UE as a relay point. Thus, the exemplary UE 110 may operate as a remote UE and/or a relay UE.

The above referenced engines each being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the UE 112, the 5G NR-RAN 120, the LTE-RAN 122, WLAN 122, etc. Accordingly, the transceiver 225 may operate on a variety of different frequencies or channels (e.g., set of consecutive frequencies).

As mentioned above, a sidelink may be used as a radio relay link. The exemplary embodiments provide the network, a remote UE and a relay UE with mechanisms to handle situations related to relay discovery and relay selection. These procedures may be used to establish a UE-to-Network relay or a UE-to-UE relay. To establish these connections, the relay UE 110 (or 112) sends a discovery message to the remote UE 112 (or 110) to indicate the availability of the relay UE 110 as a relay.

Figure 3:
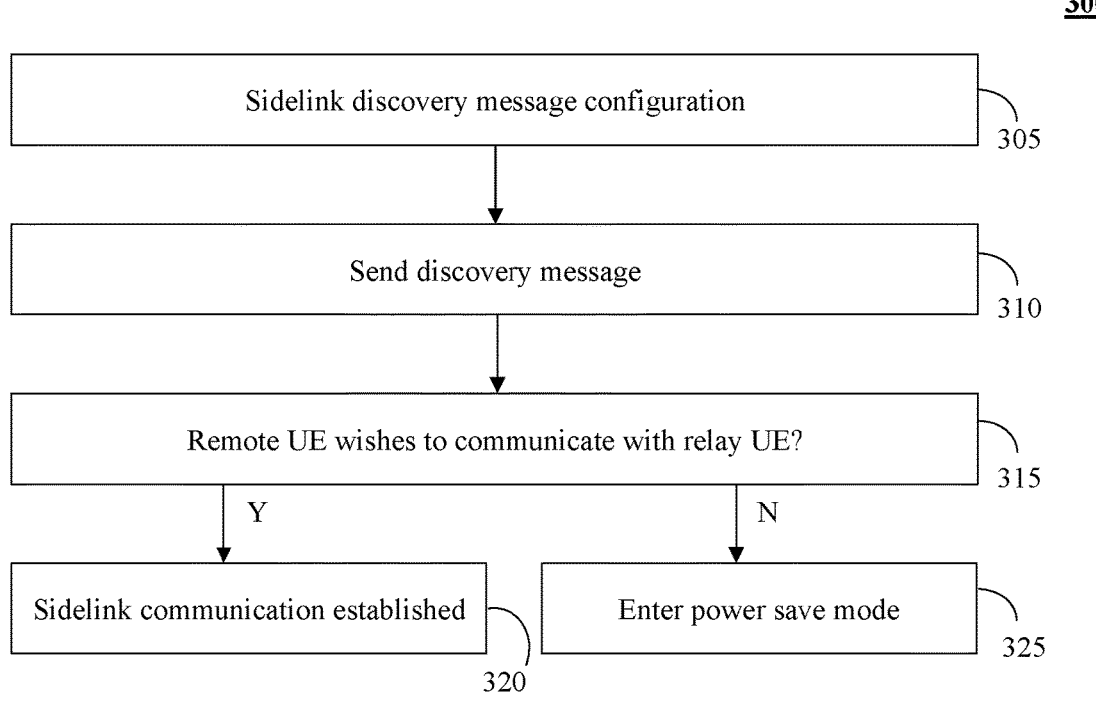
FIG. 3 shows a method of handling discovery messaging for sidelink communications according to various exemplary embodiments.

FIG. 3 shows a method 300 of handling discovery messaging for sidelink communications according to various exemplary embodiments. At 305, the UE 110 is configured with a discovery message configuration. In some exemplary embodiments, the network (e.g., the 5G NR-RAN 120, via the gNB 120A) may configure the UE 110 with the discovery message configuration via signaling, e.g., Radio Resource Control (RRC) signaling, System Information Block (SIB) signaling, etc. In other exemplary embodiments, the discovery message configuration may be defined by standard and stored in a memory of the UE 110.

As described above, there may be broadcast messages that are transmitted on a sidelink radio bearer (SLRB) in a physical sidelink shared channel (PSSCH) as part of a transport block (TB). The UE 110 may listen to these broadcast messages to discover other UEs for SL communications. However, as described above, listening to all broadcast messages is a power consuming task. Thus, in some exemplary embodiments, the discovery message configuration may include resources allocated to a dedicated discovery message resource pool. For example, the broadcast messages may include one or more resource pools. In the exemplary embodiments, one or more of these resource pools may be dedicated to discovery messages. In this manner, discovery is treated the same as other types of communications, meaning that all physical layer (PHY) channel configurations can be reused.

The UE 110 may be configured, via the discovery message configuration, with information to monitor the one or more resource pools having the discovery messages. If the UE 110, when monitoring the one or more resource pools dedicated to discovery messages, does not find the intended service resource (e.g., discovery service) in the resource pool, then the UE 110 may enter a power save mode to save power, e.g., by ignoring other broadcast messages because they pertain to services with which the UE 110 is not interested. This is based on the expectation that the discovery resource pool(s) does not overlap with other resource pools in time, such that the UE 110 can enter sleep mode if no communication is going on even if there are multiple transmission/reception pools configured.

In some exemplary embodiments, the resource pool configuration may include adding fields to the SL-BWP-Pool-Config Information Element (IE) including a sl-TxPoolDiscovery field and a sl-RxPoolDiscovery field. These fields indicate the resources by which the UE 110 is allowed to transmit sidelink discovery for transmission or reception, respectively. In other exemplary embodiments, the resource pool configuration may include adding a sl-ResourcePool-DiscoveryType field to the SL-ResourcePoolConfig IE. When the sl-ResourcePoolDiscoveryType=true, it may be considered that the resource pool is dedicated to discovery.

The resource pool configuration may include a predetermined logical channel identification (LCID) to identify a discovery service. In some embodiments, the discovery service configuration may provide an indication of a mapping of the LCID to the resource pool. In these embodiments, multiple LCID-to-pool mappings may exist based on the number of different applications. In other embodiments, the discovery service configuration may provide mapping of an address (e.g., L2 address) to the resource pool. In these embodiments, the destination address may be mapped to a certain service. When different services exist, each service may be mapped to a different L2 address, even if they involve the same remote UE.

In some embodiments, the medium access control (MAC) layer may be configured with a multiplexing rule that prevents messages associated with the logical channel(s) for discovery being transmitted on other resource pools with which the UE 110 is configured. This prevents the logical channels associated with discovery from being multiplexed into different non-discovery resource pools, thereby preventing the UE 110 from having to monitor/decode the other resource pools with which the UE 110 may not be interested.

In some embodiments, a correspondence between the discovery quality of service (QoS) data flow and the resource pool is defined. In such a scenario, upper layer discovery messages are transmitted using a QoS data flow or dedicated resource blocks (RB), which does not aggregate with other QoS flows to the same SLRB. If L2 addresses are used to identify the association with the resource pool as described above, a special destination layer 2 ID and a corresponding layer 1 ID or discovery indication may be defined to identify the discovery message.

In some embodiments, the discovery message configuration at 305 includes a predefined discovery transmission time period that is dedicated to discovery message transmissions. For example, referring to FIG. 4, it may be desirable to limit the transmissions of discovery message to a predetermined discovery time period 402a, 402b. In such an embodiment, although the resources in the PSSCH are shared, discovery periods 402a, 402b may be defined for each periodic discovery cycle 406a, 406b. In some embodiments, the discovery periods 402a, 402b are configured using an interval duration and offset at the slot level.

In some exemplary embodiments, the discovery message configuration may include information defining the discovery transmission time period. This information may include adding a type field to the SL-LogicalChannelConfig IE. The type field may be a sl-discovery-type ENUMERATED {true, false}. If true, the logical channel may be considered to be associated with discovery. In other exemplary embodiments, a fixed LCID for discovery may be defined by standards (e.g., 3GPP standards).

In some embodiments, the discovery periods 402a, 402b are defined in the MAC layer as a timer-based mechanism. After a discovery offset, the discovery timer at the MAC layer (defining the discovery period) begins. In some embodiments, the discovery offset is the time from the beginning of the transmission pool start time. In some embodiments, the discovery offset may alternatively be defined by reference to some other time such as, for example, a subframe or frame start time. At the expiration of the discovery timer, the discovery period ends. The discovery offset, discovery period length, and discovery cycle length may be configured as independent information elements (IEs). Although a dedicated resource pool may not be defined, in this embodiment, a shared resource pool may be dedicated to discovery traffic during the discovery periods 402a, 402b.

The MAC layer handles discovery traffic multiplexing with uplink or other sidelink traffic only during the discovery periods 402a, 402b. In some embodiments, a logical channel prioritization (LCP) restriction may be used to define what type of traffic will be allowed during the discovery periods. For example, a discovery multiplexing restriction is introduced at the MAC layer. In such a scenario, if one or more logical channels are flagged as a discovery logical channel (e.g., by a unique LCID or other flags), the flagged logical channel is only multiplexed in the discovery periods 402a, 402b. RBs that are not flagged as discovery RBs are not multiplexed during the discovery period 402a, 402b. In the non-discovery periods 404a, 404b, the flagged logical channel is not selected. If the relay UE 110 does not have any known sidelink traffic, the relay UE 110 may skip sidelink processing to save power. In such a scenario, the relay UE 110 follows existing DRX cycles to enter into a power saving mode.

In some embodiments, non-discovery traffic may alternatively be permitted during the discovery periods 402a, 402b if it is determined that there is little discovery traffic. In such a scenario, although non-discovery traffic is permitted, discovery traffic is given a higher priority during the discovery periods 402a, 402b. This prioritization is configured by configuring the discovery SLRB with a unique high priority or using a predetermined priority promotion scheme in the MAC layer. This may be a modification of the MAC layer multiplexing restriction discussed above. The higher priority is assigned to the discovery traffic using the discovery offset and the discovery timer in the MAC specification. During the pendency of the discovery timer, discovery traffic (discovery SLRB) is given the highest priority relative to other traffic. In some embodiments, to ensure the discovery SLRB has the highest priority during the discovery periods 402a, 402b, a different set of resource allocation parameters (e.g., shorter scanning) may be defined.

In some embodiments, discovery messages may be mapped to a specific RB. In such an embodiment, the RB may have either the highest priority and shortest back-off or it is the only RB allowed for transmission during the discovery periods 402a, 402b. After the discovery time expires, however, an LCP restriction is configured for the discovery RB. In some embodiments, the discovery messages are specifically defined in the MAC layer as the only messages that are permitted to be transmitted during the discovery periods 402a, 402b or as the messages with the highest priority during these periods. In some embodiments, discovery messages may not be transmitted outside of the discovery periods 402a, 402b. In some embodiments, only LCP restrictions or transmission restrictions are configured during the non-discovery periods 404a, 404b.

In some embodiments, to achieve the discovery time configuration discussed above, the gNB 120A may use configured grants (CGs) to limit traffic during the discovery periods 402a, 402b to discovery messaging. An LCP constraint may be used to limit the grant for a special LCID associated with discovery.

Although the description above has been made with respect to discovery messaging power saving solutions, it should be noted that these methods and configurations may be equally applicable to general broadcast/groupcast service-based power saving. For example, a dedicated resource pool may be configured for broadcast/groupcast traffic.

In some embodiments, this may be carried out by associating a service with a unique LCID, a unique service identifier (e.g., a hash of a service ID), or a destination address. In order to allow the receiving UEs to enter a power saving mode, a "schedule" of transmissions may be available to the receiving UE, which allows the receiving UE to map the potential transmission resources with each transmission for a given service. This may be accomplished by indicating the transmission resources used with an associated pair of source and destination addresses or an associated pair of source addresses and service identifiers. Such a schedule may be configured by the gNB 120A as part of the resource pool configuration or a configured grant or by transmitting UEs using control messages via sidelink communications.

Similar to the discovery traffic time configuration discussed above, critical broadcast/groupcast time periods and non-critical broadcast/groupcast time periods (similar to discovery periods 402a, 402b and non-discovery periods 404a, 404b, respectively) may be configured for a UE.

Returning to FIG. 3, after the discovery message configuration described above has been received, at 310, the relay UE 110 broadcasts a discovery message. At 315, the relay UE 110 determines if a remote UE 112 wishes to communicate with the relay UE 110 via sidelink communications. If the remote UE 315 wishes to communicate with the relay UE 110, then, at 320, sidelink communications are initiated. However, if no remote UE wish to communicate with the relay UE 110, then, at 325, the relay UE enters a power saving mode (default DRX cycle).

The above exemplary embodiments were described with reference to discovery messages for SL communications. However, those skilled in the art will understand that the exemplary embodiments may be applied to any type of broadcasts in SL. For example, as described above a dedicated resource pool may be defined for discovery messages. However, in other exemplary embodiments, dedicated resource allocations for other services may be further defined for specific resource pools. For example, a service may be associated with information such as, a special LCID, a special service identifier (e.g., a hash of the service ID) and a destination address. With this information, the UE may understand the resources that are used for a particular service, which may result in reduced sensing and unnecessary contentions.

To configure the UE 110 for this type of operation, new fields may be added to the SL-ResourcePool IE to specify the traffic allowed to use this resource pool. The new fields may include an sl-AllowedLogicalChannelGroup field that indicates the logical channel group and an sl-AllowedLayer2 field that indicates a destination layer 2 ID allowed to use this resource pool. In other exemplary embodiments, a new field specifying the list of resource pool index dedicated for the logical channel may be added to the SL-LogicalChannelConfig IE.

Similar to the discovery example provided above, a correspondence between the control message QoS flow and the resource pool may be defined. This QoS correspondence may include upper layer discovery messages being transmitted using a QoS flow that does not aggregate with other QoS flows to the same SLRB. In addition, if layer 2 addresses are used to identify the association with the resource pool, a special destination layer 2 ID and a corresponding layer 1 ID or discovery indication may be defined.

In such exemplary embodiments, to allow the receiving UEs to enter a power save mode, a "schedule" of transmissions may be available to the receiving UEs allowing the receiving UEs to map the potential transmission resources with each transmission for a given service. This may be accomplished by indicating the transmission resources used with an associated pair of source and destination addresses or an associated pair of source address and service identifier. This "schedule" may be configured by the gNB (e.g., gNB 120A) as part of the resource pool configuration or a configured grant. In other exemplary embodiments, this schedule may be configured by the transmitting UE using control messages on the SL.

Figure 4:
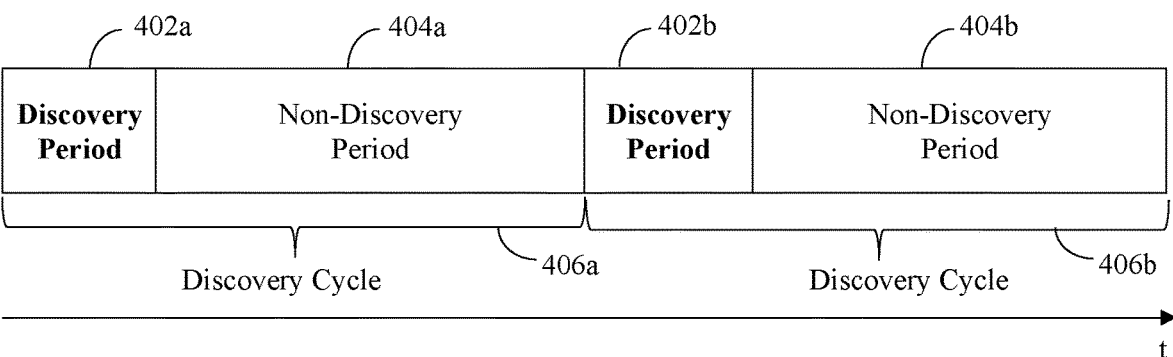
FIG. 4 shows a diagram of a discovery message time configuration according to various exemplary embodiments.
Figure 5:
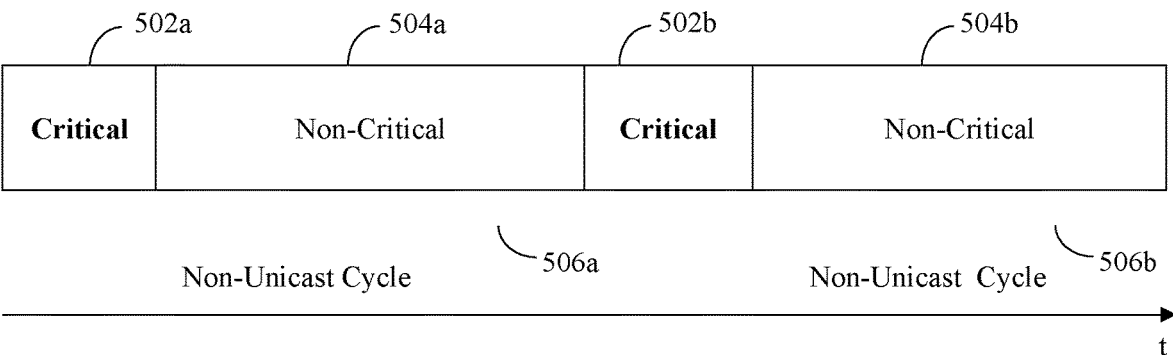
FIG. 5 shows a diagram of a non-unicast message time configuration according to various exemplary embodiments.

In other exemplary embodiments as described above, the discovery message configuration included a predefined discovery transmission time period that is dedicated to discovery message transmissions as was illustrated in FIG. 4. This may also be generalized for all non-unicast messages (e.g., broadcast, groupcast). FIG. 5 shows a diagram of a non-unicast message time configuration according to various exemplary embodiments. The diagram of FIG. 5 is similar to the diagram of FIG. 4. The diagram includes two non-unicast cycles 506a and 506b. Each cycle 506a and 506b includes a corresponding critical period 502a and 502b, respectively, and a non-critical period 504a and 504b, respectively.

The critical non-unicast periods 502a and 502b may be aligned with the DRX cycle of the UE 110, e.g., the OnDurations of the DRX cycle. Similar to the discovery periods 402a and 402b described above, the critical non-unicast periods 502a and 502b may be prioritized and based on an interval and an offset at the slot level. After the critical non-unicast prioritized period offset, the critical non-unicast prioritized period starts, which also starts a critical non-unicast prioritized timer at the MAC layer. The timer value defines the critical non-unicast period length. When the critical non-unicast prioritized timer expires, the critical non-unicast prioritized period ends. The non-critical non-unicast periods 504a and 504b may be subject to an LCP restriction, as described above, based on the critical non-unicast prioritized periods 502a and 502b.

In some exemplary embodiments, the discovery message configuration may include information defining the critical non-unicast periods. This information may include adding a type field to the SL-LogicalChannelConfig IE. The type field may be a Broadcastperiod-prioritized-flag ENUMERATED {true, false}. If true, the logical channel may be considered to be associated with the prioritized period.

For resource selection, a critical non-unicast traffic multiplexing restriction may be introduced at the MAC layer. The UE 110 may then operate under the conditions that if a logical channel is flagged as a "critical non-unicast prioritized" logical channel, the logical channel is only multiplexed in the critical non-unicast prioritized period. In the non-critical period, the logical channel is not selected. The UE 110 may follow the normal DRX cycle to enter power saving mode.

The exemplary embodiments may provide the UE 110 with a configuration for these time periods as described with respect to FIG. 5. The configuration may include a list of one or more logical channels identified as critical non-unicast prioritized logical channels. This may configured by adding a critical flag in a logical channel configuration or by a cast type. The configurations for the offset, period length, and cycle length may be added as an independent information element (IE). The QoS flow correspondence as described above may also be used. In some exemplary embodiments, a rule may be introduced that if a logical channel carries a non-unicast type it is only multiplexed in a critical non-unicast period.

In addition, at the MAC layer, two approaches may be taken during the non-unicast prioritized periods 502a, 502b. In a first approach, resources are dedicated to non-unicast prioritized traffic and additional multiplexing rules may be added to prevent non-broadcast prioritized SLRBs to be multiplexed during the non-unicast prioritized periods 502a, 502b. The rule may be based on, for example, the same broadcast prioritized flag which identifies the discovery logical channel as was described above.

In a second approach, during the non-unicast prioritized periods 502a, 502b, other traffic may continue but the broadcast prioritized SLRB has a higher priority. The prioritization may be achieved by configuring a broadcast prioritized SLRB with a special high priority, or by specifying in the MAC layer a priority promotion scheme. The SLRB should have a highest priority during the non-unicast prioritized periods 502a and 502b. To ensure the broadcast of the prioritized SLRB has a higher probability of obtaining resources, further mechanisms such as defining a different set of resource allocation parameters (e.g., shorter sensing) may be added.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A user equipment (UE), comprising:

a transceiver configured to communicate with a base station via a first connection and at least one further UE via a second connection; and a processor communicatively coupled to the transceiver and configured to perform operations comprising:

receiving a discovery configuration information message comprising an information element (IE) with a field configured to indicate a resource pool dedicated for sidelink discovery services;

transmitting the discovery message as a broadcast based on the discovery configuration information message; and receiving a signal from the further UE regarding the discovery message, wherein the second connection is a sidelink connection.

2. The UE of claim 1, wherein a second parameter in the discovery configuration information message associates the resource pool with the discovery services.

3. The UE of claim 2, wherein the discovery configuration information message includes a mapping of the LCID to resources of the resource pool.

4. The UE of claim 2, wherein the discovery configuration information message includes a mapping of a layer 2 (L2) address to resources of the resource pool.

5. The UE of claim 4, wherein messages not associated with the L2 address are prevented from being transmitted on the resource pool.

6. The UE of claim 2, wherein messages associated with the LCID are prevented from being transmitted on other resource pools.

7. The UE of claim 2, wherein the discovery message is transmitted using one of a quality of service (QOS) data flow or a resource block (RB) dedicated to discovery messages which are not aggregated with other QoS data flows at a sidelink radio bearer (SLRB).

8. The UE of claim 1, wherein the discovery configuration information further includes a predetermined discovery time period dedicated to discovery messaging.

9. A processor of a first user equipment (UE) configured to perform operations comprising:

receiving a discovery configuration information message from a base station comprising an information element (IE) with a field configured to indicate a resource pool dedicated for sidelink discovery services;

transmitting the discovery message as a broadcast based on the discovery configuration information message; and receiving a signal from a second UE regarding the discovery message via sidelink communications.

10. The processor of claim 9, wherein a second parameter in the second discovery configuration message associates the resource pool with the discovery services.

11. The processor of claim 10, wherein the discovery configuration information message includes a mapping of the LCID to resources of the resource pool.

12. The processor of claim 10, wherein the discovery message configuration includes a mapping of a layer 2 (L2) address to resources of the resource pool and wherein messages associated with the LCID are prevented from being transmitted on other resource pools.

13. The processor of claim 9, wherein at least one parameter in the discovery configuration information message is a predetermined discovery time period dedicated to discovery messaging.

14. The processor of claim 13, wherein the predetermined discovery time period is defined by an offset and an interval duration, and wherein the offset is a predetermined period of time after a beginning of a transmission pool start time.

15. The processor of claim 14, wherein if a logical channel is flagged as a discovery logical channel it is only multiplexed in the predetermined discovery time period.

16. The processor of claim 14, wherein if a logical channel is flagged as a discovery logical channel, the discovery message is transmitted in response to a configured grant received from the base station.

17. The processor of claim 14, wherein transmission resources are dedicated to discovery traffic during the predetermined discovery time period.

18. The processor of claim 14, wherein discovery traffic is given a highest priority of all transmissions allowed during the predetermined discovery time period.

* * * * *